(12) United States Patent
Takeda et al.

(10) Patent No.: US 11,082,260 B2
(45) Date of Patent: Aug. 3, 2021

(54) NETWORK SYSTEM, NETWORK DEVICE, AND RECORDING MEDIUM

(71) Applicant: FUJIFILM Business Innovation Corp., Tokyo (JP)

(72) Inventors: Koji Takeda, Yokohama (JP); Hiroki Ikenaga, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/846,391

(22) Filed: Apr. 12, 2020

(65) Prior Publication Data
US 2021/0091977 A1   Mar. 25, 2021

(30) Foreign Application Priority Data
Sep. 19, 2019   (JP) .............................. JP2019-170685

(51) Int. Cl.
*H04L 12/46*   (2006.01)
*H04L 29/08*   (2006.01)

(52) U.S. Cl.
CPC .......... *H04L 12/4641* (2013.01); *H04L 67/10* (2013.01); *H04L 67/141* (2013.01)

(58) Field of Classification Search
CPC ... H04L 12/4641; H04L 67/10; H04L 67/141; H04L 29/12009; H04L 29/12103; H04L 29/08738; H04L 29/08972
See application file for complete search history.

(56) References Cited

U.S. PATENT DOCUMENTS

| | | | | |
|---|---|---|---|---|
| 7,715,310 B1* | 5/2010 | Sajassi | ...................... | H04L 1/22 370/219 |
| 9,838,268 B1* | 12/2017 | Mattson | ................... | H04L 41/32 |
| 10,291,462 B1* | 5/2019 | Joyce | .................... | H04L 41/046 |

(Continued)

FOREIGN PATENT DOCUMENTS

JP   2012039218   2/2012

OTHER PUBLICATIONS

Smart hybrid SDN approach for MPLS VPN management on digital environmentAyoub, Bahnasse; Talea Mohamed; Badri Abdelmajid; Louhab Fatima Ezzahraa; Laafar Sara. Telecommunication Systems 73.2: 155-169. New York: Springer Nature B.V. (Feb. 2020) (Year: 2020).*

(Continued)

*Primary Examiner* — Michael Won
(74) *Attorney, Agent, or Firm* — JCIPRNET

(57) ABSTRACT

A network system includes: a hub base that includes a first network device with a hub function, the first network device being connected to an information communication network; and a spoke base that includes a second network device without the hub function, the second network device being connected to the information communication network. Communication between a computer provided in the spoke base and an external device connected with the computer via Internet is performed such that intra-network loopback communication is performed between the first network device and the second network device in the information communication network without an internet service provider, and communication is performed between the first network device and the external device via the internet service provider.

9 Claims, 5 Drawing Sheets

(56) References Cited

U.S. PATENT DOCUMENTS

| | | |
|---|---|---|
| 2003/0037163 A1* | 2/2003 | Kitada ............... H04L 61/6022 |
| | | 709/236 |
| 2005/0091311 A1 | 4/2005 | Lund et al. |
| 2008/0195733 A1* | 8/2008 | Detienne ............ H04L 12/4633 |
| | | 709/224 |
| 2008/0316914 A1* | 12/2008 | Vercellone .............. H04L 43/50 |
| | | 370/216 |
| 2009/0157901 A1 | 6/2009 | Asati et al. |
| 2010/0150057 A1 | 6/2010 | Miklos et al. |
| 2012/0239626 A1* | 9/2012 | Aysan ..................... H04L 45/30 |
| | | 707/674 |
| 2013/0086280 A1* | 4/2013 | James .................... H04L 45/10 |
| | | 709/238 |
| 2014/0169286 A1 | 6/2014 | Xu et al. |
| 2016/0050125 A1* | 2/2016 | Mattson .............. H04L 41/5051 |
| | | 709/225 |
| 2016/0157160 A1 | 6/2016 | Bosch et al. |
| 2018/0026877 A1 | 1/2018 | Mysyk |
| 2019/0190588 A1* | 6/2019 | Higgins ............... H04W 48/16 |
| 2021/0029195 A1* | 1/2021 | Kolbe ................. H04L 61/1511 |

OTHER PUBLICATIONS

"Search Report of Europe Counterpart Application", dated Sep. 25, 2020, p. 1-p. 13.

"Search Report of Europe Counterpart Application", dated Jan. 22, 2021, p. 1-p. 13.

\* cited by examiner

NETWORK SYSTEM, NETWORK DEVICE, AND RECORDING MEDIUM

CROSS-REFERENCE TO RELATED APPLICATIONS

This application is based on and claims priority under 35 USC 119 from Japanese Patent Application No. 2019-170685 filed on Sep. 19, 2019.

BACKGROUND

Technical Field

The present disclosure relates to a network system, a network device, and a recording medium.

Related Art

When communication is performed between bases via the Internet, construction of a virtual private network (a VPN) is generally performed in view of security, as disclosed in JP-A-2012-039218, for example. The VPN may be constructed in a hub-and-spoke system in which a base with a hub function and a spoke base without the hub function are mixed in terms of network management, scale, or the like. The spoke base in the hub-and-spoke system communicates, via a hub base connected via VPN, with another spoke base or an external device connected to the Internet.

In recent years, a next generation network (an NGN) based on an Internet Protocol (IP) technology has become widespread. The hub base and the spoke base that are connected to the next generation network are connected to an Internet Service Provider (ISP) via the next generation network to communicate with an external device on the Internet.

In a related art, there is a method of connecting to the Internet according to a protocol called PPP over Ethernet (PPPoE). In a case of a network system to which a PPPoE method is introduced, for example, when an ID and a password are specified from a computer provided at any base, the computer is connected to the Internet after being tunneled with the ISP authenticated based on the ID and the password.

In recent years, a protocol called IP over Ethernet (IPoE) has been proposed as a protocol for connecting to the ISP. In IPoE, line authentication is performed to determine which ISP is to be connected.

SUMMARY

When the spoke base communicates with the external device via the Internet, the spoke base is connected to the hub base via a network termination device and an ISP as a contract destination provided in the next generation network, and further via an ISP and a network termination device provided in a hub base. The hub base is connected to the Internet via the network termination device provided in the next generation network and an internet service provider as the contract destination. Accordingly, the spoke base communicates with the external device via the hub base. However, when traffic increases, the communication speed is not stable due to congestion in the network termination device.

Aspects of non-limiting embodiments of the present disclosure relate to stabilizing communication speed when a spoke base communicates with an external device via the Internet as compared with a case where the spoke base communicates with a hub base via an internet service provider.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a network system including: a hub base that includes a first network device with a hub function, the first network device being connected to an information communication network; and a spoke base that includes a second network device without the hub function, the second network device being connected to the information communication network, wherein communication between a computer provided in the spoke base and an external device connected with the computer via Internet is performed such that intra-network loopback communication is performed between the first network device and the second network device in the information communication network without an internet service provider, and communication is performed between the first network device and the external device via the internet service provider.

BRIEF DESCRIPTION OF DRAWINGS

Exemplary embodiment(s) of the present invention will be described in detail based on the following figures, wherein.

DETAILED DESCRIPTION

Hereinafter, exemplary embodiments of the present disclosure will be described with reference to the drawings.

Figure 1:
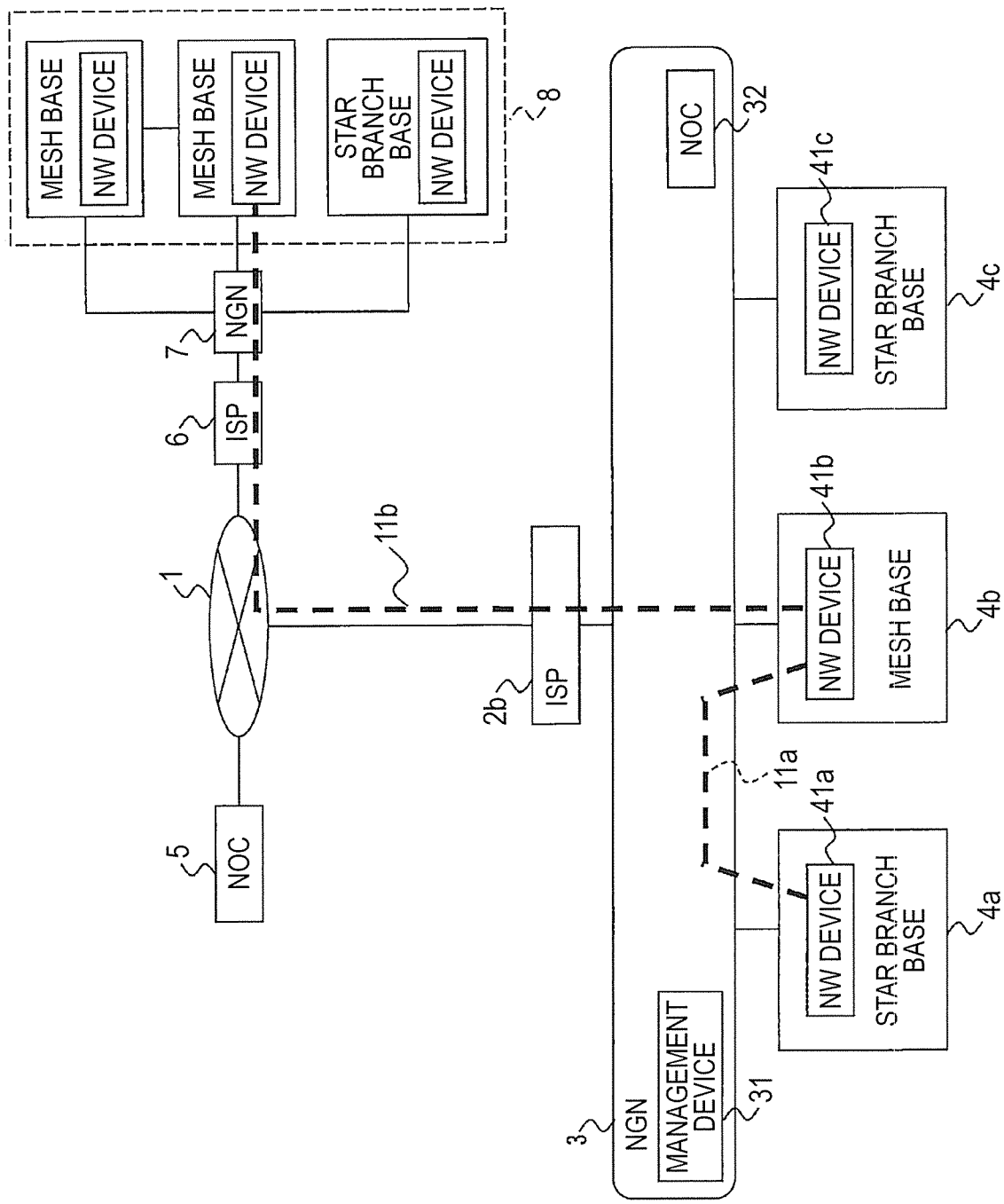
FIG. 1 is an overall configuration diagram showing a network system according to an exemplary embodiment.

FIG. 1 is an overall configuration diagram showing a network system according to the present exemplary embodiment. FIG. 1 shows an Internet 1, an ISP 2*b*, an NGN 3, a base 4, a network operation center (NOC) 5, an ISP 6, an NGN 7, and a base 8. The ISPs 2*b* and 6 are carriers that provide a service for connecting to the Internet 1, and are also simply referred to as "providers".

An information communication network according to the present exemplary embodiment uses an IP network as a network and is connected to another information communication network or a network such as a PSTN network, ISDN network, an Internet, or the like. The information communication network has at least an end user function, a transport function, and a network attachment control function, as architecture. Issuance of address information to be described below is achieved by the network attachment control function of performing a series of processing when a network device is connected to the network. In the present exemplary embodiment, a case in which a next generation network (also referred to as an "NGN") is used as an information communication network as shown in FIG. 1 will be described as an example.

The NGNs 3 and 7 are next generation information communication networks based on an IP technology. The NGNs 3 and 7 include network termination devices (not shown). When the NGN 3 is connected to the Internet by a PPPoE method, the base 4 is connected to a contract destination ISP via the network termination device. An IP over Ethernet (IPoE) method is a communication method capable of bypassing a network termination device that is currently a bottleneck in the PPPoE method. The network system according to the present exemplary embodiment is connected to the Internet 1 according to the IPoE method.

In the present exemplary embodiment, the Next Generation Network provided by the NTT (Nippon Telegraph and Telephone Corporation) group is assumed as the NGN 3, but the NGN 3 is not limited thereto. For example, a network including the next generation network provided by the NTT group may be used. When another company provides a next generation network which is an information communication network based on the IP technology and has a function equivalent to that of the next generation network provided by the NTT group, the NGN 3 according to the present exemplary embodiment may be the next generation network provided by the other company.

The bases 4a to 4c correspond to, for example, offices of a company, respectively. Each of the bases 4a to 4c is provided with one or plural computers such as a personal computer (PC) or the like. The bases 4a to 4c are collectively referred to as the "base 4" when it is not necessary to distinguish the bases 4a to 4c from one another. The same applies to other components.

The base 4 according to the present exemplary embodiment constitutes a hub-and-spoke type VPN. In the base 4, a port of the base 4b, to which the NGN 3 is connected, is provided with a network (NW) device 41b with a hub function for connecting to the Internet 1 in another base. Therefore, the base 4b corresponds to a hub base. The computer provided in the base 4b is connected to the NGN 3 via the network device 41b. On the other hand, ports of the bases 4a and 4c and to which the NGN 3 is connected, are provided with network (NW) devices 41a and 41c without the hub function. Therefore, the bases 4a and 4c correspond to spoke bases. The computers provided at the bases 4a and 4c are connected to the NGN 3 via the network devices 41a and 41c.

In the present exemplary embodiment, only the base 4b has a subscription with the ISP 2b. Therefore, only the network device 41 provided at the base 4b is connectable to the Internet 1 via the NGN 3 and the ISP 2b. The bases 4a and 4c does not have a subscription with the ISP. Therefore, the network devices 41a and 41c provided in the bases 4a and 4c cannot be directly connected to the Internet 1. In other words, the bases 4a and 4c may be connected to the Internet 1 via the base 4b without subscription. Information regarding the subscription with the ISP at each base 4 corresponds to attribute information of this base 4.

The network device 41b provided in the base 4b with the hub function and is a full mesh type device connectable to each of the network devices 41 connected via the VPN. Therefore, the base 4b is also referred to as a "mesh base" in the present exemplary embodiment. The base 4b constructs a mesh VPN while the bases 4a and 4c are branch locations configured to construct a star VPN. Therefore, the bases 4a and 4c are also referred to as "star branch bases" in the present exemplary embodiment. In the bases 4a and 4c according to the present exemplary embodiment, all communication with other bases (including communication via the Internet 1) is performed via the mesh base 4b.

The NOC 5 is a network operation center that is connected to the Internet 1 and is configured to manage address information of the network device connected to the Internet 1. The "address information" is identification information that is specified for identifying a device on the network, and is generally represented by a number. For example, in a case of Internet communication as in the present exemplary embodiment, the address information is an IP address, and an IPv4 format, an IPv6 format, or IPv4 over IPv6 format is used depending on the connection method (PPPoE or IPoE) with the Internet 1, a configuration of the ISPs 2b and 6 or NGNs 3 and 7, and the subscription.

The NGN 3 according to the present exemplary embodiment includes a management device 31 and a NOC 32. The management device 31 has the above-described function of the information communication network, and performs general management of the NGN 3 such as issuance of the IP address in the NGN 3 or the like. The NOC 32 is connected so as to be referred to from the NGN 3 and has the same function as that of the NOC 5, but a management range thereof is limited to the network device 41 directly connected to the NGN 3. When the network device 41 is connected to the NGN 3, the network device 41 notifies a set of a name of the network device 41, such as identification information like a domain name, and the IP address to the NOC 32 of the NGN 3 as attribute information of the network device 41. With the set being stored in the NOC 32, the network device 41 becomes a network device to be managed. When the IP address is changed, the network device 41 notifies the set of its name and the changed IP address to the NOC 32 of the NGN 3. The attribute information of the network device 41 also includes information regarding the subscription with the ISP. The NOC 32 refers to the attribute information of the network device 41 connected to the NGN 3, and responds with the IP address of the network device 41 to be connected in response to a query from the network device 41 to which the name of the network device 41 to be connected is specified.

The ISP 6 and the NGN 7 are provided in another network system using the Internet 1, and the ISP 6 and the NGN 7 may have an existing function. Of course, the NGN 7 may have a function equivalent to that of the NGN 3.

The base 8 is a mesh base or a star branch base similarly to the above-described base 4. In terms of the base 4, a computer (not shown) provided in the base 8 corresponds to an external device connected via the Internet 1.

Figure 2:
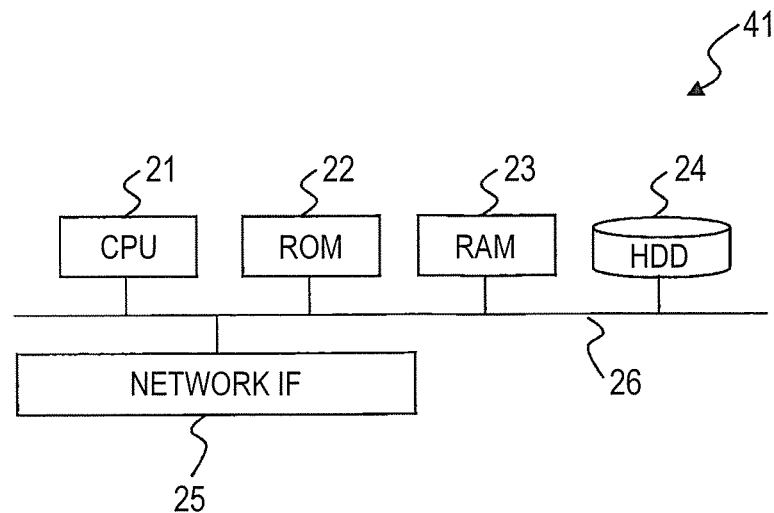
FIG. 2 is a schematic hardware configuration diagram of a network device according to the present exemplary embodiment.

FIG. 2 is a schematic hardware configuration diagram of the network device 41 according to the present exemplary embodiment. The network device 41 according to the present exemplary embodiment includes a computer, and may be implemented by a general-purpose hardware configuration presenting in the related art. Accordingly, as shown in FIG. 2, the network device 41 includes at least a CPU 21 which is a processor, storage units which are a ROM 22, a RAM 23, a hard disk drive (HDD) 24, and the like, and a network interface (IF) 25. The network device 41 according to the present exemplary embodiment has various functions as network devices, such as a firewall, a gateway, a router, and the like. These functions and functions that are characteristic in the present exemplary embodiment (described below) are implemented by cooperative operation of the computer mounted on the network device 41 and a program operated by the CPU 21 mounted on the computer.

The ISPs 2 and 6, the NOCs 5 and 32, and the management device 31 according to the present exemplary embodiment are also implemented by a computer, so that the ISPs 2 and 6, the NOCs 5 and 32, and the management device 31 have at least a configuration shown in FIG. 2.

The program used in the present exemplary embodiment may be provided by means of any communication means as well as by being stored in a computer readable recording medium such as a CD-ROM, a USB memory, or the like. The program provided by means of the communication means or the recording medium is installed in the computer, and is sequentially executed by the CPU of the computer to perform various processing.

Next, in the present exemplary embodiment, processing when a computer (hereinafter referred to as an "in-base terminal") provided in the star branch base 4a communicates with a computer (hereinafter, referred to as an "external device") provided in the base 8 will be described. Processing performed by the network device 41a in the star branch base 4a will be described with reference to a flowchart shown in FIG. 3.

When receiving a communication request from the in-base terminal, the network device 41a broadcasts a request to issue an IP address to the NGN 3 so as to acquire an IP address used by the network device 41a (step 101).

When receiving the request to issue an IP address from the network device 41a, the management device 31 in the NGN issues the IP address. As will be described below, if the star branch base 4a has a subscription with the ISP, the ISP issues the IP address. However, in the present exemplary embodiment, according to the attribute information of the star branch base 4a, the star branch base 4a does not have a subscription with the ISP. Therefore the ISP is not an issuance source and the NGN 3 is controlled to be the issuance source. In FIG. 1, the ISP 2b is provided corresponding to the mesh base 4b, whereas no ISP is provided corresponding to the star branch base 4a, which indicates that the star branch base 4a does not have a subscription with the ISP.

When the network device 41a acquires the IP address in response to the transmitted request to issue an IP address (step 102), the network device 41a subsequently acquires the IP address of the network device 41b by sending a request to acquire address information including a name (that is, a domain name of the network device 41b) of the mesh base 4b which is known, to the NOC 32 (step 103).

In a case where the issuance source of the IP address is NGN3 (YES in step 104), the network device 41a performs VPN connection according to a security architecture for IP (IPsec) protocol, and establishes a communication path with the network device 41b in a network of the NGN 3 (step 105). A method of establishing a communication path is not limited to IPsec, and may be a method of simply adding routing information or a method of constructing a tunnel by the IPsec protocol or an IPIP protocol. Communication between network devices, here, between the network devices 41a and 41b in the NGN 3 without using the ISP is referred to as "intra-network loopback communication". In FIG. 1, a path by the intra-network loopback communication is schematically shown by a broken line 11a. The network device 41 may identify the issuance source from an IP address system.

Subsequently, the network device 41b is connected to the Internet 1 via the ISP 2b. Then, the network device 41b relays communication of the in-base terminal such that the in-base terminal may communicate with the external device. In FIG. 1, a communication path between the network device 41b and the external device is schematically shown by a broken line 11b.

Accordingly, as indicated by the broken lines 11a and 11b, the network device 41a provided in the star branch base 4a makes the in-base terminal communicate with the external device by the communication path via the network device 41 provided in the mesh base 4b. In particular, the network device 41a performs the intra-network loopback communication with the network device 41b without using the ISP.

In the present exemplary embodiment, the network device 41a may acquire the IP address of the network device 41b by providing the NOC 32 in the NGN 3. However, as another device configured to attain a correspondence between the name of the device and the IP address of the device instead of the NOC 32, for example, a domain name system (DNS) may be provided in the NGN 3. The DNS is also referred to as a "name decision server", and responds with an IP address of the network device 41 which is an IPv6 address or the like in response to a query in which the domain name of the network device 41 has been specified.

The present exemplary embodiment describes a case in which the issuance source of the IP address is NGN3. However, the issuance source of the IP address may be the ISP in a case where the star branch base 4a has a subscription with the ISP. Such a case will also be described.

Figure 4:
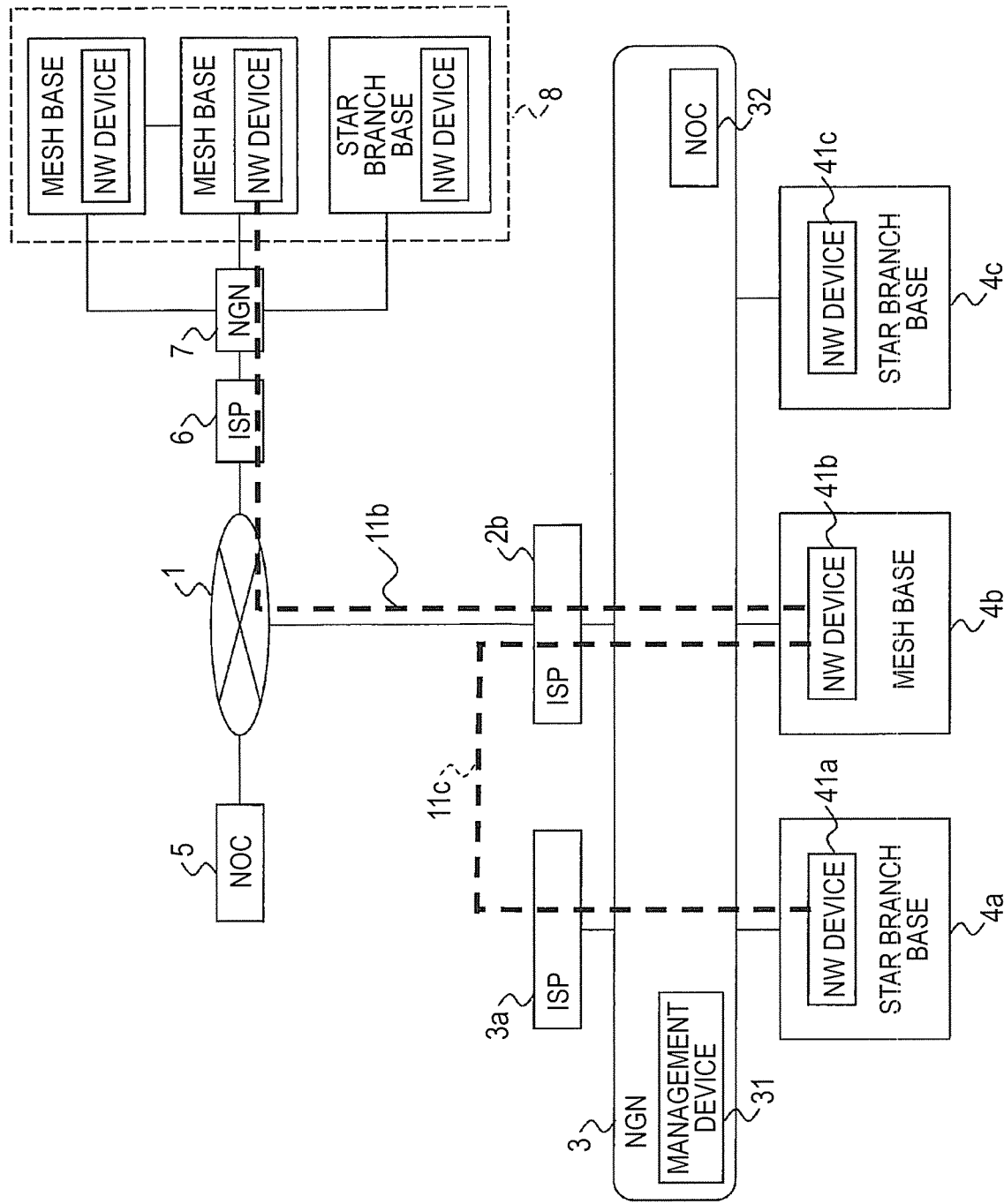
FIG. 4 is an overall configuration diagram showing a network system when it is assumed that the star branch base has a subscription with an ISP.

FIG. 4 is an overall configuration diagram of a network system when the star branch base 4 has a subscription with the ISP. FIG. 4 is different from FIG. 1 in that an ISP 2a corresponding to the star branch base 4a is connected to the NGN 3 in terms of the system configuration.

Figure 3:
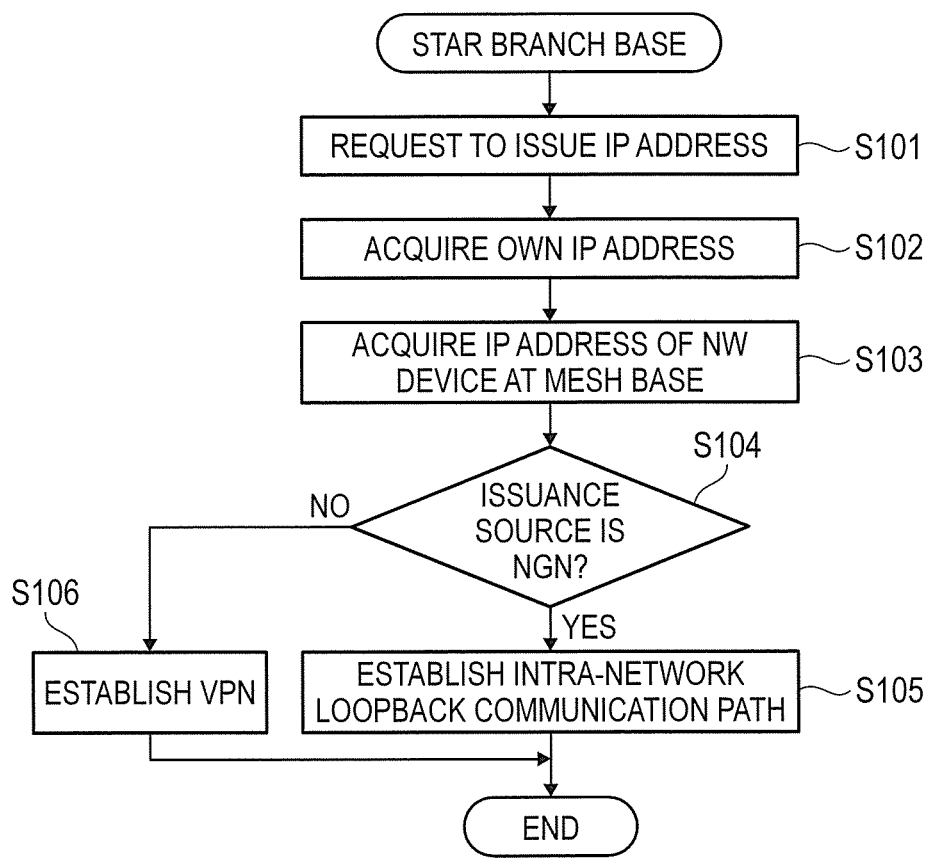
FIG. 3 is a flowchart showing processing when a star branch base according to the present exemplary embodiment establishes communication with an external device.

In FIG. 3, when the IP address issuance source is the ISP 2a (NO in step 104), the network device 41a is connected to the ISP 2a, and an Internet VPN is established via the ISP 2b (step 106). That is, communication between bases is established between the network device 41a and the network device 41b via the ISPs 2a and 2b as indicated by a broken line 11c, instead of the intra-network loopback communication indicated by the broken line 11a. In a case of the IPoE (native) method, strictly speaking, a virtual network enabler (a VNE) may have issued the IP address to the network device 41. However, it is understood that the IP address issued by the VNE is managed by the ISP, so that the network device 41 recognizes the issuance source as the ISP.

Figure 5:
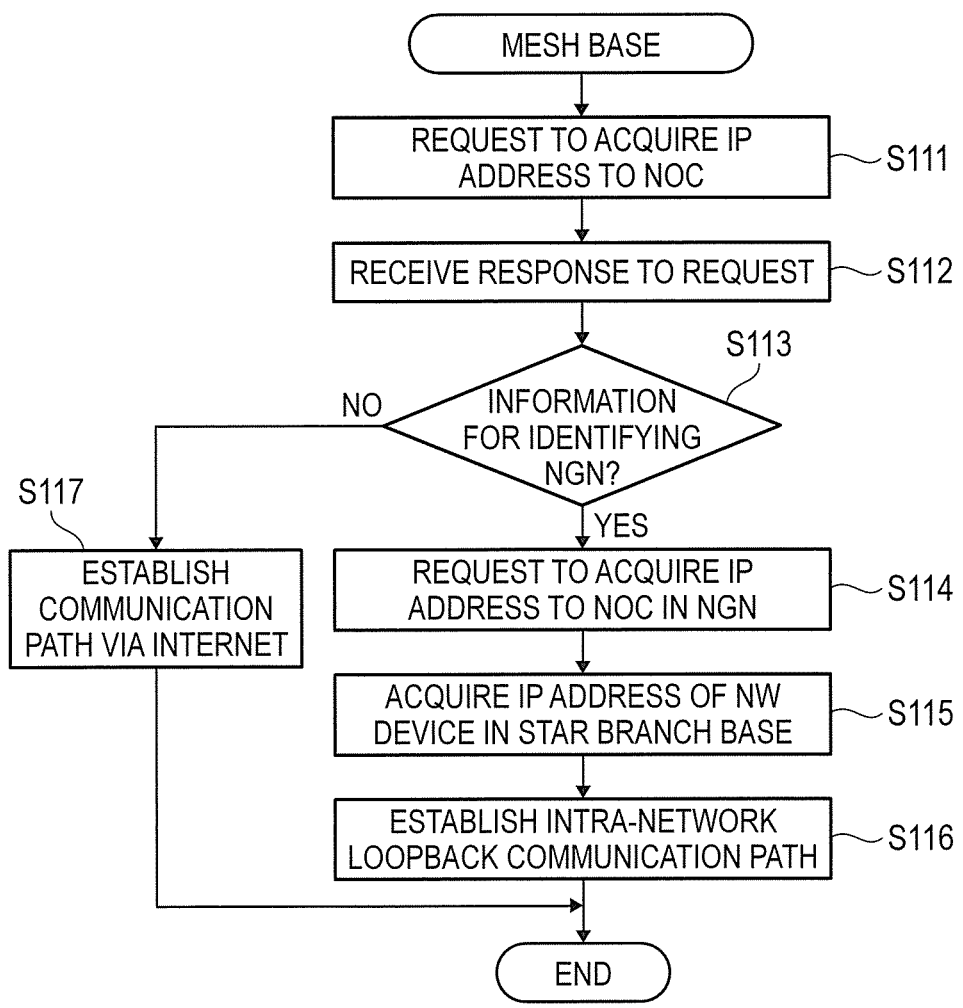
FIG. 5 is a flowchart showing processing when a mesh base according to the present exemplary embodiment establishes communication with the star branch base.

In the present exemplary embodiment, as described above, the network device 41a may be mainly operated to establish the intra-network loopback communication between the network device 41a and the network device 41b. However, the network device 41b may also be mainly operated to establish the intra-network loopback communication. This processing will be described with reference to a flowchart shown in FIG. 5.

In order to establish the communication path, it is necessary to acquire the IP address of the network device 41a to be a communicated with, so that the network device 41b connected to the Internet 1 queries, according to normal operation, to the NOC 5 connected to the Internet 1 for the IP address of the network device 41a by transmitting a request to acquire the IP address of the network device to be communicated with (step 111). The request to acquire the IP address includes the name of the network device 41b that identifies the network device. The NOC 5 identifies the network device 41a to be communicated with from subscription information or the like. If the network device whose IP address is to be acquired is connected to the Internet 1, the NOC 5 may respond with the IP address of the network device connected to the Internet 1 in response to the request to acquire the IP address. However, the base 4a does not have a subscription with the ISP and is not connected to the Internet 1, so that the NOC 5 does not manage the IP address of the network device 41a. In this case, the NOC 5 responds with information indicating that the IP address cannot be acquired. In the present exemplary embodiment, the NOC 5 responds with, as the information indicating that the IP address is unavailable, the name of the network device 41a that includes the domain name and the like identifying the NGN 3 to which the network device 41a to be communicated with is connected.

The network device 41b receives a response from the NOC 5 in response to the request to acquire the IP address (step 112). If the response is the name of the network device (YES in step 113), the NGN 3 is identified from this information, and the request to acquire the IP address of the network device 41a is transmitted to the NOC 32 of the identified NGN 3 (step 114). The request to acquire the IP address includes the name of the network device 41 which is the domain name or the like. The NOC 32 manages the set including the name and the IP address of the network device 41 in the NGN 3, so that the NOC 32 responds with the IP address of the network device 41a in response to the request to acquire the IP address.

When the network device 41b acquires the IP address of the network device 41a (step 115), the network device 41b establishes a path for performing the intra-network loopback communication with the network device 41a in the NGN 3. The method of establishing the communication path may be the method of simply adding routing information or the method of constructing a tunnel by the IPsec protocol or the IPIP protocol. After the path is established, the intra-network loopback communication may be performed between the network device 41a and the network device 41b.

If the network device 41b has transmitted the request to acquire the IP address of the network device connected to the Internet 1, the NOC 5 responds with the IP address of the network device connected to the Internet 1 in response to the request to acquire the IP address. When the network device 41b acquires the IP address from the NOC 5 (NO in step 113), the network device 41b establishes the communication with the network device via the Internet 1 (step 117).

The NGN 3 responds to the request to issue an IP address from the network device 41b, so that a provider 2a issues the IP address when the star branch base 4a has an IPoE-type provider subscription and the NGN 3 issues the IP address when the star branch base 4a does not have the IPoE-type provider subscription. In this case, when the IP address has been issued from the provider 2a, the network device 41b performs the VPN connection with the network device 41a by an Internet VPN method. On the other hand, when the IP address has been issued from the NGN 3, the network device 41b performs the VPN connection with the network device 41a by intra-network loopback.

In the above description, the case of connecting to the Internet 1 according to the IPoE method has been described as an example. Here, a case of connecting to the Internet 1 according to the PPPoE method will be described.

Figure 6:
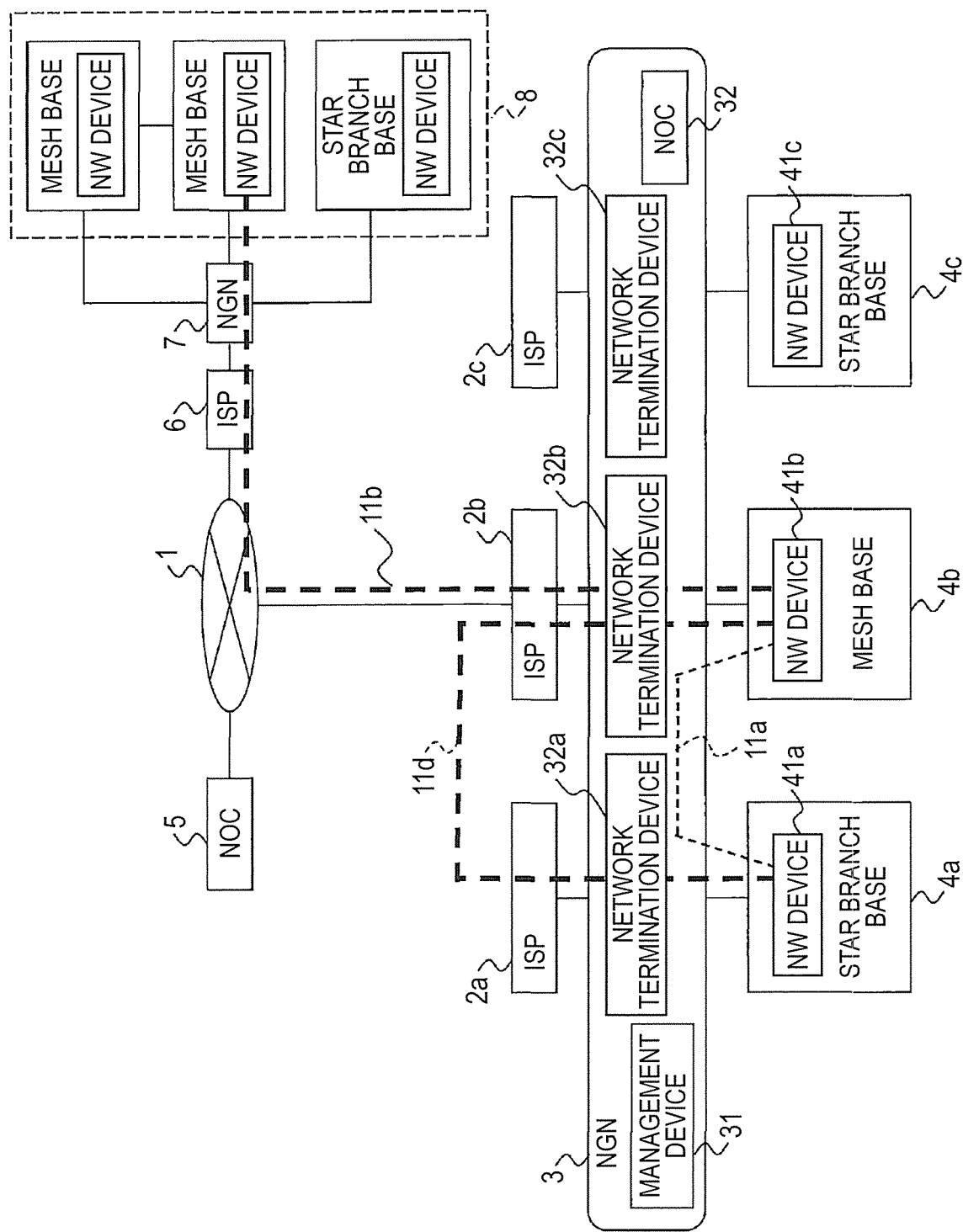
FIG. 6 is an overall configuration diagram showing a network system when it is assumed that the network system is connected to the Internet by a PPPoE method.

In contrast to the configuration shown in FIG. 1, the ISPs 2a to 2c are respectively associated with the bases 4a to 4c in FIG. 6. That is, each base 4 has a subscription with the ISP 2 to connect to the Internet 1 according to the PPPoE method. According to the subscription with the ISP 2, network termination devices 32a to 32c are provided in the NGN 3 corresponding to the ISPs 2a to 2c. The number of the network termination devices 32a to 32c provided corresponding to the ISPs 2a to 2c and the ISP 2 to be a contract destination are not particularly described.

Here, as described with reference to the flowchart shown in FIG. 3, when the network device 41a broadcasts the request to issue an IP address to the NGN 3 (step 101), the ISP 2a becomes the issuance source of the IP address1 since the star branch base 4a has a subscription with the ISP 2a. In a case where the ISP 2a is the issuance source of the IP address (NO in step 104), the Internet VPN is established between the network device 41a and the network device 41b. That is, the network device 41a is connected to the ISP 2a via the network termination device 32a. The network device 41b is connected to the ISP 2b via the network termination device 32b. A communication path by the Internet VPN established as described above is indicated by a broken line 11d. A procedure of establishing a communication path between the network device 41b and the external device is the same as that using the IPoE method, so that a description thereof will be omitted. The communication path between the network device 41b and the external device is schematically shown by a broken line 11b.

As described above, in a case of using the PPPoE method, the in-base terminal in the star branch base 4a communicates with the external device through paths 11d and 11b as shown in FIG. 6. At this time, when the communication by the path 11d, that is, the communication between the star branch base 4a and the mesh base 4b via the Internet VPN is performed, it is necessary to pass through the network termination device 32 three times, that is, to pass through the network termination device 32a when exiting from the NGN 3 to the ISP 2a, to pass through the network termination device 32b when entering the NGN 3 from the ISP 2a via the ISP 2b, and to pass through the network termination device 32b when exiting from the NGN 3 to the ISP 2b.

The network termination device 32 is said to cause a decrease in communication speed and instability. However, if the intra-network loopback communication indicated by the broken line 11a is performed between the network device 41a and the network device 41b, the network termination device 32 may be passed only once. That is, when the communication is performed from the in-base terminal to the external device, the decrease in communication speed and the instability may be prevented by implementing the intra-network loopback communication in the NGN 3.

In order to show a difference between the communication between the base 4a and the base 4b via the Internet VPN and that via the intra-network loopback communication, FIG. 4 shows a configuration in which the ISPs 2a and 2c, and the network termination device 32 are provided. However, since the intra-network loopback communication is implemented, subscriptions with the ISPs 2a and 2c at the star branch bases 4a and 4c become unnecessary, and the network termination device 32 becomes unnecessary. Accordingly, the intra-network loopback communication may improve not only the communication speed but also the cost efficiency.

In the exemplary embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A network system comprising:
   a hub base that includes a first network device with a hub function, the first network device being connected to an information communication network; and
   a spoke base that includes a second network device without the hub function, the second network device being connected to the information communication network,
   wherein communication between a computer provided in the spoke base and an external device connected with the computer via Internet is performed such that intra-network loopback communication is performed between the first network device and the second network device in the information communication network without an internet service provider, and communication is performed between the first network device and the external device via the internet service provider,
   wherein, in response to an issuance request to the information communication network to issue address information from the second network device, the internet service provider issues address information in a case where the spoke base has an IPoE-type provider subscription and the information communication network issues the address information in a case where the spoke base does not have the IPoE-type provider subscription,
   the second network device performs VPN connection with the first network device by an Internet VPN method in a case where the address information has been issued by the internet service provider, and
   the second network device performs the VPN connection with the first network device by intra-network loopback in a case where the address information has been issued by the information communication network.

2. The network system according to claim 1,
   wherein at least one of the first network device and the second network device makes an inquiry to a network operation center connected to the information communication network for information of a network device as a connection destination, the network operation center being referable from the information communication network and storing information of a network device to which the at least one of the first network device and the second network device is connected, and
   the at least one of the first network device and the second network device performs connection to the network device as the connection destination based on a response from the network operation center.

3. The network system according to claim 2 further comprising the network operation center.

4. The network system according to claim 2,
   wherein the at least one of the first network device and the second network device registers a name and address information of the at least one the first network device and the second network device in the network operation center connected to the information communication network that manages a set including a name and address information of network devices when connected to the information communication network,
   the at least one of the first network device and the second network device issues a request to acquire address information to the information communication network based on a name of the network device as the connection destination that is stored in advance or obtained as a result of the inquiry to the network operation center, and
   the at least one of the first network device and the second network device performs VPN connection based on the address information acquired from the information communication network.

5. The network system according to claim 2,
   wherein the at least one of the first network device and the second network device notifies a name and address information of the at least one the first network device and the second network device to the network operation center when the at least one of the first network device and the second network device is connected to the information communication network and when the address information of the at least one of the first network device and the second network device is changed,
   the at least one of the first network device and the second network device issues a request to acquire address information to the network operation center based on a name of the network device as the connection destination that is stored in advance, and
   the at least one of the first network device and the second network device performs VPN connection based on the address information corresponding to the name of the network device as the connection destination that has been acquired from the network operation center in response to the request to acquire the address information.

6. The network system according to claim 1,
   wherein the at least one of the first network device and the second network device notifies a name and address information of the at least one of the first network device and the second network device to a network operation center when the at least one of the first network device and the second network device is connected to the information communication network and when the address information of the at least one of the first network device and the second network device is changed, the network operation center storing information relating to a connection destination of a network device and notifying, in response to a request from a network device to acquire information of a network device as the connection destination, address information of the network device as the connection destination, and the at least one of the first network device and the second network device performs VPN connection based on the address information acquired from the network operation center.

7. The network system according to claim 1, wherein the first network device transmits an acquisition request to acquire address information of the second network device not connected to the Internet to a network operation center connected to the Internet for managing address information of a network device connected to the Internet, and, in a case where information indicating that the address information of the second network device is unavailable is received from the network operation center in response to the acquisition request, the first network device acquires the address information of the second network device to be communicated with by intra-network loopback by transmitting a request to acquire the address information of the second network device to the information communication network.

8. The network system according to claim 7 further comprising the network operation center.

9. The network system according to claim 1, wherein the second network device transmits an issuance request to issue address information of the second network device to the information communication network and selects, according to an issuance source of the address information acquired in response to the issuance request, a communication path for communication between a computer provided in the spoke base and an external device connected with the computer via Internet, wherein, in a case where the issuance source of the address information acquired is the information communication network, the second network device selects a communication path such that intra-network loopback communication is performed, without using an internet service provider, in the information communication network between the second network device and the first network device.

* * * * *